(12) United States Patent  (10) Patent No.: US 8,466,951 B2
Huang et al.  (45) Date of Patent: Jun. 18, 2013

(54) WIRELESS DIGITAL PICTURE FRAME WITH VIDEO STREAMING CAPABILITIES

(75) Inventors: Wei-Cheng Huang, Taipei Hsien (TW); Mei-Yi Tsai, Taipei Hsien (TW); Chih-Liang Chou, Taipei Hsien (TW)

(73) Assignee: Chicony Electronics Co., Ltd., Taipei Hsien (TW)

( * ) Notice: Subject to any disclaimer, the term of this patent is extended or adjusted under 35 U.S.C. 154(b) by 859 days.

(21) Appl. No.: 12/588,892

(22) Filed: Nov. 2, 2009

(65) Prior Publication Data

US 2010/0253842 A1  Oct. 7, 2010

(30) Foreign Application Priority Data

Apr. 6, 2009 (TW) ................................ 98205492 U

(51) Int. Cl.
*H04N 7/14* (2006.01)
(52) U.S. Cl.
USPC .................. 348/14.05; 348/14.02; 348/14.03; 348/143
(58) Field of Classification Search
USPC .......... 348/14.02, 14.01, 14.04, 14.05, 14.07, 348/143; 379/110.01
See application file for complete search history.

(56) References Cited

U.S. PATENT DOCUMENTS

| 2002/0126150 A1* | 9/2002 | Parry ............................. 345/771 |
| 2008/0143890 A1* | 6/2008 | Rosencwaig et al. ......... 348/836 |
| 2009/0171970 A1* | 7/2009 | Keefe .............................. 707/10 |
| 2010/0022218 A1* | 1/2010 | Chen ............................. 455/411 |
| 2010/0039496 A1* | 2/2010 | Kazemi et al. ............. 348/14.08 |
| 2011/0029604 A1* | 2/2011 | Bell et al. ...................... 709/203 |

\* cited by examiner

*Primary Examiner* — Stella Woo
(74) *Attorney, Agent, or Firm* — Bacon & Thomas, PLLC

(57) ABSTRACT

A wireless digital picture frame with video streaming capabilities comprises: a body having a video display unit, a first audio I/O unit, a first input unit, a first processor, and a first wireless transceiver unit; and a wireless camera having a video input unit, a second audio I/O unit, an audio codec unit, a second processor, and a second wireless transceiver unit. The body and the wireless camera communicate with each other through Wi-Fi connection. The wireless communication thus enables the wireless camera to capture A/V signals and transmit the captured signals back to the first processor of the body to be played by the video display unit and the first audio I/O unit; at the same time, the captured A/V data may also be stored to an external storage medium connected to the wireless digital picture frame. The above process forms a video recording mode and a surveillance mode.

20 Claims, 4 Drawing Sheets

WIRELESS DIGITAL PICTURE FRAME WITH VIDEO STREAMING CAPABILITIES

BACKGROUND OF THE INVENTION

1. Field of the Invention

The present invention relates to a digital picture frame. More particularly, the present invention relates to a digital picture frame that uses a Wi-Fi camera to stream videos.

2. Description of the Related Art

Traditionally, photos are kept in photo albums. However, since photos are prone to damage or tend to fade with time, even photo albums are inadequate in preserving photos. Besides, inserting and retrieving photos through a photo album are rather inconvenient as well.

Thanks to developments in computer technologies, most photos now can be scanned into electronic format for preserving or directly taken as digital photos by digital cameras, so that people can browse their photos in computer. However, since the digital photos stored in the computer can only be available when the computer is on, it is still inconvenient in terms of photo browsing and sharing. To answer the call for the digital photos to be rightly available in the living room, the bedroom, and the office, an independent digital picture frame is specifically developed for digital-photo displaying. For most present-day digital picture frames, the digital photos, video clips, and music stored in a storage medium are accessed, displayed, or played by means of a built-in memory slot or a card reader. And the design of the appearance is similar to traditional picture frame. Moreover, most of the additional functions are intended for environment detection, through which the characteristics of the device are adjusted automatically or the display functions are activated. For instance, when the brightness of the environment is identified, the brightness of display will be adjusted automatically. Or, when changes in light or sound are detected, automatic functions such as the display function will be activated.

In recent years, due to the rapid growth of wireless network technologies, along with the proliferation of multimedia devices and the advance in digital data encoding/decoding solutions, it has become a trend in telecommunication technologies to integrate wireless network functions with all kinds of services related to multimedia contents. Given the significant developments in technologies related to digital display, image processing, and wireless communication, along with the substantial improvement in the performance of digital processors and the increasing capacities of storage media with decreased prices, it is advantageous to use the functions of traditional digital picture frames as a basis and to capitalize on the good quality of the display and the mobility of the digital picture frame to develop more functions and devices that can better accommodate daily requirements. For example, functions such as wireless surveillance and video recording, wireless Internet access, support for various storage media or for wireless digital data exchange, etc., will certainly help transform the traditional digital picture frame into a popular multi-functional product in regular households and provide better using experience.

SUMMARY OF THE INVENTION

An object of the present invention is to provide a wireless digital picture frame with video streaming capabilities that can also record videos.

Another object of the present invention is to provide a wireless digital picture frame with video streaming capabilities that can be used to conduct remote surveillance.

Yet another object of the present invention is to provide a wireless digital picture frame with video streaming capabilities that can support videoconferencing or videophone functions.

To achieve the above objects, the present invention provides a wireless digital picture frame with video streaming capabilities comprising: a body having a video display unit, a first audio I/O unit, a first input unit, a first processor, and a first wireless transceiver unit; and a wireless camera having a video input unit, a second audio I/O unit, an audio codec unit, a second processor, and a second wireless transceiver unit. With the present invention, a command is input to the first processor through the first input unit. Then, the command signal is transmitted to the second processor through wireless communication between the first wireless transceiver unit and the second wireless transceiver unit using the Internet or a local area network (LAN), for controlling the video input unit to capture a real-time video signal and for controlling the second audio I/O unit to receive a real-time audio signal concurrently. Then, the real-time audio signal is digitized and encoded by the audio codec unit; then, the real-time video signal and the real-time audio signal are sent back to the first processor through wireless communication between the second wireless transceiver unit and the first wireless transceiver unit using the Internet or the LAN. Finally, the real-time video signal is transmitted to the video display unit to be displayed and the real-time audio signal is transmitted to the first audio I/O unit to be played, so that the body can play remote A/V signals in real time through the wireless camera.

DETAILED DESCRIPTION OF THE PREFERRED EMBODIMENTS

Figure 1:
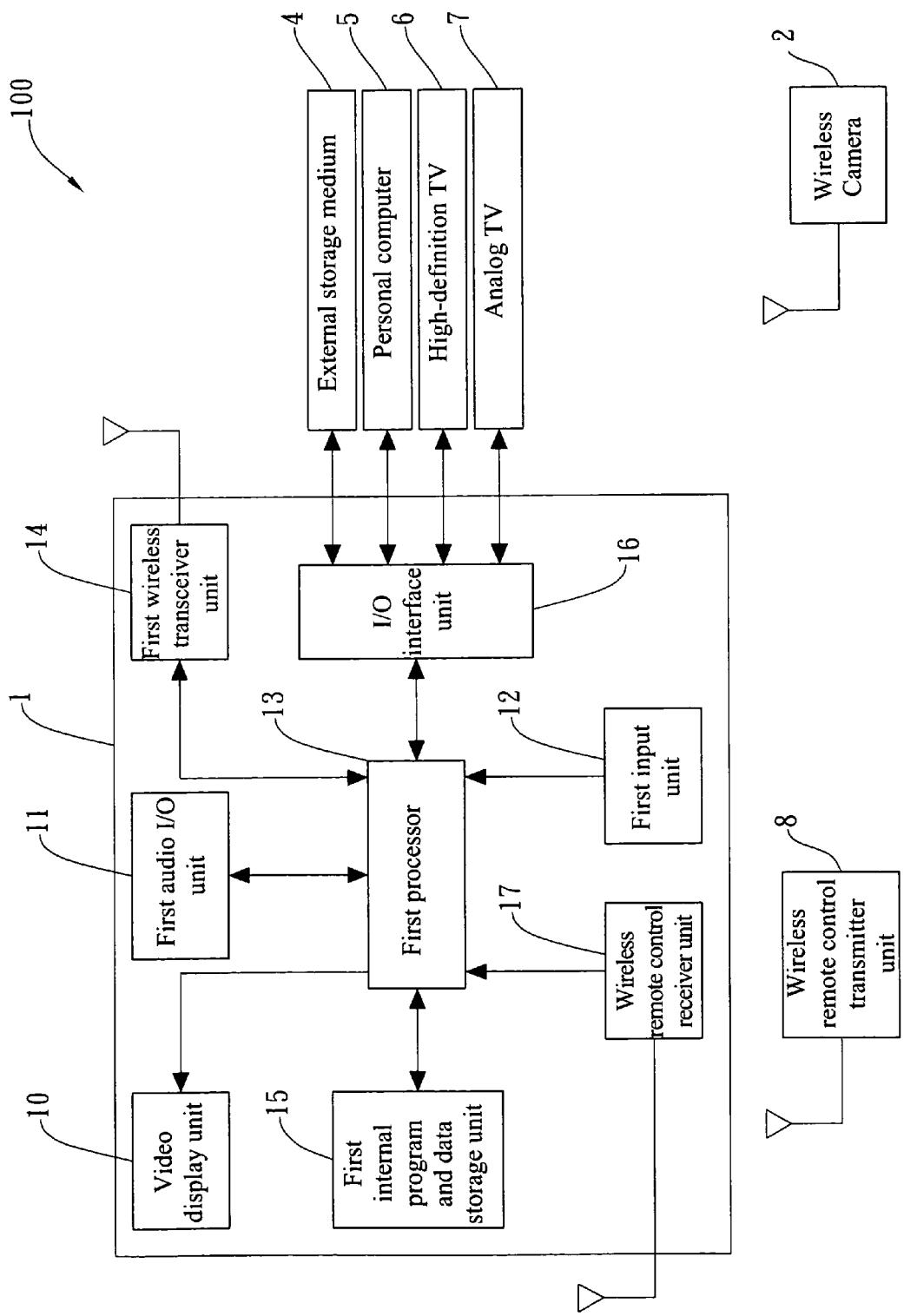
FIG. 1 depicts a block diagram of a wireless digital picture frame with video streaming capabilities of the present invention.

Referring to FIG. 1, a block diagram of a wireless digital picture frame with video streaming capabilities of the present invention is shown. The wireless digital picture frame 100 with video streaming capabilities comprises: a body 1 having a video display unit 10, a first audio I/O unit 11, a first input unit 12, a first processor 13, and a first wireless transceiver unit 14; and a wireless camera 2 having a video input unit 20, a second audio I/O unit 21, a second processor 23, an audio codec unit 24, and a second wireless transceiver unit 25.

The video display unit 10 of the body 1 is composed of a TFT display panel for displaying digital contents such as digital pictures, digital videos, or digital information, etc. The first audio I/O unit 11 is used to play the audio signals of digital content. The video display unit 10 combined with the first audio I/O unit 11 can play or display multimedia content that includes A/V data. The first input unit 12 of the body 1 is used to transmit a command signal to the first processor 13, which wirelessly communicates with the wireless camera 2. Therefore, the wireless camera 2 can be controlled to capture A/V signals and to display the captured video signals on the video display unit 10 and/or to play audio signals by the first audio I/O unit 11. Alternatively, the first processor 13 may retrieve digital content from a storage medium for displaying photos, or videos on the video display unit 10 of the body 1 and playing audio content by the first audio I/O unit 11, or for playing music only.

The first processor 13 is used to run the built-in operating system and application software, to control the operations of the body, to process the transmission, encoding and decoding of the A/V data, and to access internal or external storage media. The first wireless transceiver unit 14 and the second wireless transceiver unit 25 are connected wirelessly using Wi-Fi technology, so that wireless communication can be achieved between the body 1 and the wireless camera 2.

The body 1 further includes a first internal program and data storage unit 15, an I/O interface unit 16, and a wireless remote control receiver unit 17. The first internal program and data storage unit 15 is used to store programs and data. The I/O interface unit 16 is used to connect to an external storage medium 4, a personal computer (PC) 5, a high-definition TV (HDTV) 6, or an analog TV 7. When the user inputs a command through the first input unit 12 of the body 1, the command is sent to the first processor 13, which then retrieves digital pictures or videos from the external storage medium 4 or personal computer 5. The retrieved pictures or videos are then displayed on the video display unit 10 of the body 1, or played by the first audio I/O unit 11. The I/O interface unit 16 may be a multi-card reader interface, a USB interface, a High Definition Multimedia Interface (HDMI), or a standard video output interface. The multi-card reader interface may connect to one of the CompactFlash (CF), MultiMedia Card (MMC), Memory Stick (MS), Secured Digital (SD), and xD-Picture Card (xD); the USB interface may connect to a USB mass storage device. Other than being displayed or played by the body 1, A/V data may also be sent to the HDTV 6 through an HDMI of the I/O interface unit 16 for HDTV output, so as to provide the users with higher quality playback. Still, A/V data may be sent to the analog TV 7 through the standard video output interface for analog TV output. Moreover, other than being output, the captured A/V data may be stored to the external storage medium 4 through the I/O interface unit 16. If the body 1 is connected to the PC 5 through a USB interface, data transfer between the external storage medium 4 and the PC 5 is possible. Through the USB interface of the I/O interface unit 16, data stored in either the external storage medium 4 or PC 5 can be accessed by or synchronized with each other under the control of the processor 13. On the other hand, the wireless remote control receiver unit 17 is used to receive commands input to the wireless remote control transmitter unit 8, so that the first processor 13 will further control the operations of the body 1 according to the commands. For example, the processor 13 may control the video display unit 10 to display pictures or control the first audio I/O unit 11 to play music; the processor 13 may also control the I/O interface unit 16 to exchange data between the external storage medium 4 and the PC 5, to output A/V signals to the HDTV 6 or TV 7, or to access other multimedia contents. The wireless remote control transmitter unit 8, using infrared or wireless communication, transmits a command signal to the first processor 13 through the wireless remote control receiver unit 17 of the body 1. Therefore, the wireless camera 2, which wirelessly communicates with the first processor 13, can be controlled to capture A/V signals and to play the captured A/V signals by the video display unit 10 and the first audio I/O unit 11. Alternatively, the first processor 13 may retrieve digital content from a storage medium for displaying photos, pictures or videos on the video display unit 10 of the body 1 and playing audio content by the first audio I/O unit 11, or for playing music only.

Figure 2:
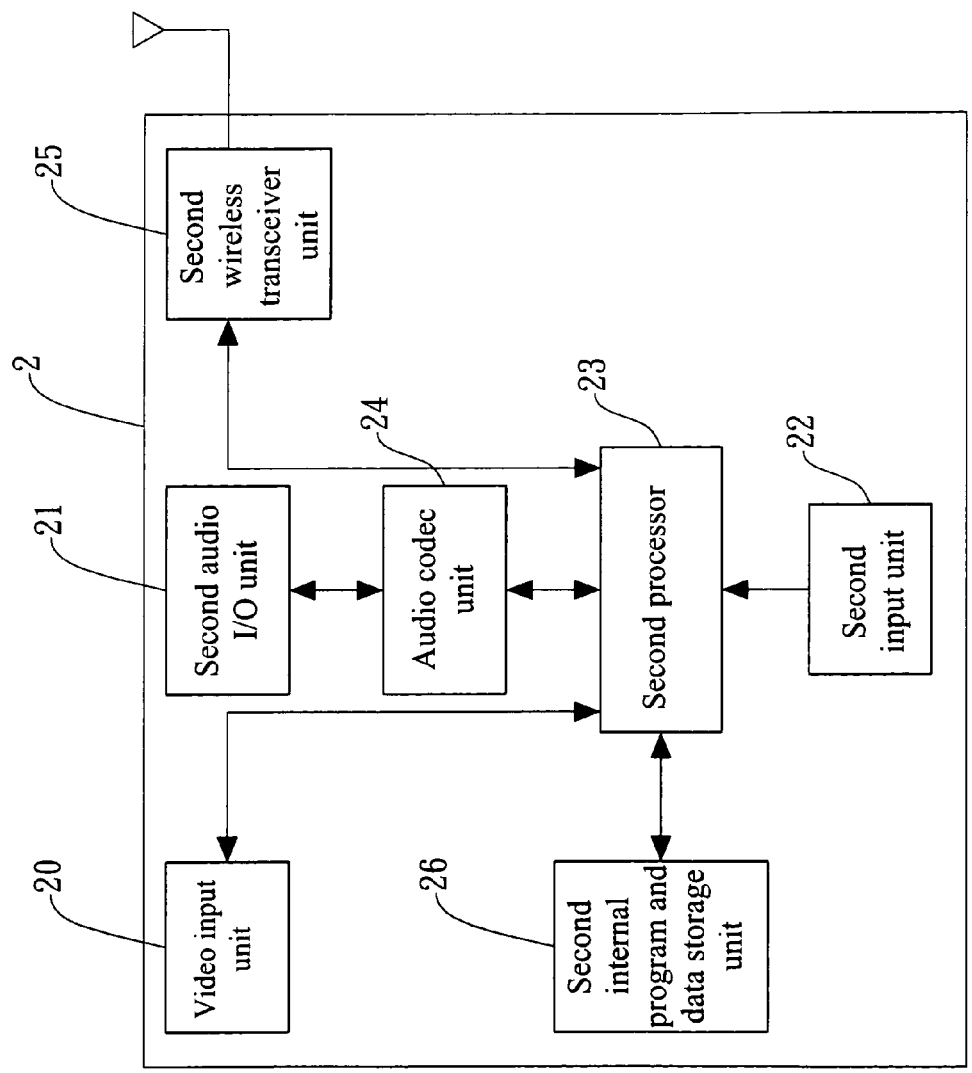
FIG. 2 depicts a block diagram of a wireless camera of the present invention.

Referring still to FIG. 1 along with FIG. 2, FIG. 2 depicts a block diagram of a wireless camera of the wireless digital picture frame with video streaming capabilities of the present invention. The video input unit 20 of the wireless camera 2 is used to capture video signals, whereas the second audio I/O unit 21 is used to receive and play audio signals of digital content. The second input unit 22 is used to transmit an input command to the second processor 23 for controlling the video input unit 20 to capture video signals and controlling the second audio I/O unit 21 to receive audio signals.

The second processor 23 is used to run the built-in software to control the operations of the wireless camera 2, and to process the transmission and encoding of the A/V data. The second wireless transceiver unit 25 and the first wireless transceiver unit 14 are connected wirelessly using Wi-Fi technology, so that wireless communication can be achieved between the body 1 and the wireless camera 2.

The wireless camera 2 further includes a second internal program and data storage unit 26 for storing programs and data.

In this embodiment, the first input unit 12 may utilize a keypad or a touch screen for input. Further, the first wireless transceiver unit 14 may achieve wireless communication through the Internet or a LAN, so as to allow the user to access the Internet or transfer data wirelessly.

In the wireless digital picture frame 100 with video streaming capabilities of the present invention, the body 1 and the wireless camera 2 are two individual units. Moreover, the wireless camera 2 is a movable device that can be located, according to the user's needs, at a position where the user needs to record videos. After the first processor 13 receives a command input by the user through the first input unit 12, the command signal is transmitted to the second processor 23 through wireless communication between the first wireless transceiver unit 14 and the second wireless transceiver unit 25 so as to control the video input unit 20 to capture real-time video signals and control the second audio I/O unit 21 to receive real-time audio signals concurrently. The audio signals are then digitized and encoded by the audio codec unit 24. Next, the real-time video signals captured by the video input unit 20 and the real-time audio signals received by the second audio I/O unit 21 are sent back to the first processor 13 through wireless communication between the second wireless transceiver unit 25 and the first wireless transceiver unit 14. The captured real-time video signals are then sent to the video display unit 10 to be displayed, while the real-time audio signals are sent to the first audio I/O unit 11 to be played synchronously; the A/V data may also be stored to the external storage medium 4 at the same time. The above process thus forms a video recording mode.

Figure 3:
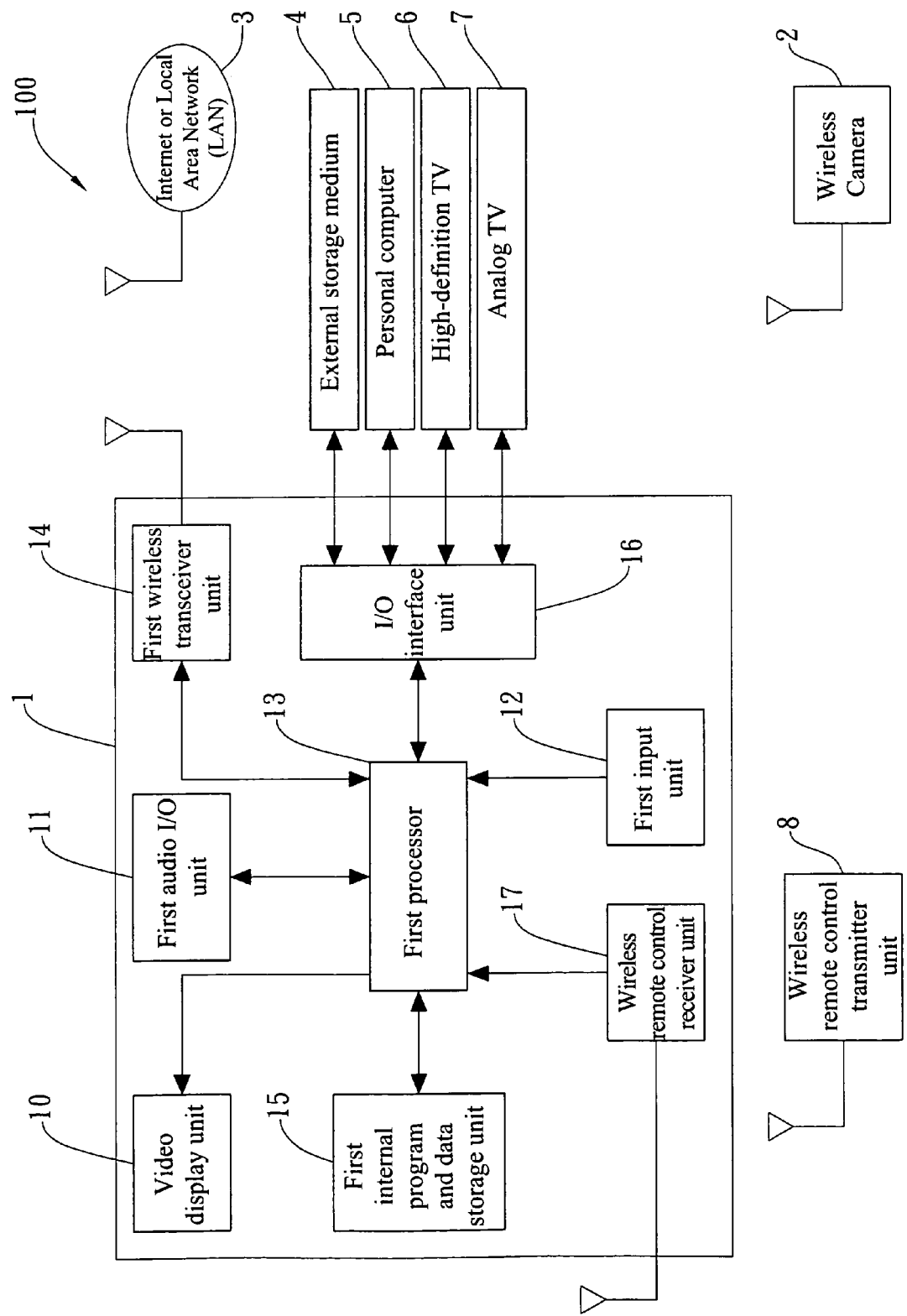
FIG. 3 depicts a block diagram of a wireless digital picture frame with video streaming capabilities according to another embodiment of the present invention.

Referring to FIG. 3, a block diagram of a wireless digital picture frame with video streaming capabilities according to another embodiment of the invention is shown. This embodiment is basically the same as the embodiment shown in FIG. 1: the body 1 and the wireless camera 2 of the wireless digital picture frame 100 are two individual units, and the wireless camera 2 is a movable device. The only difference is that the wireless camera 2 in this embodiment is located, according to the user's needs, at a remote end where the user needs to take photos or record videos. After the first processor 13 receives a command input by the user through the first input unit 12, the command signal is transmitted to the second processor 23 through wireless communication between the first wireless transceiver unit 14 and the second wireless transceiver unit 25 so as to control the video input unit 20 to capture real-time video signals and control the second audio I/O unit 21 to receive real-time audio signals concurrently. The audio signals are then digitized and encoded by the audio codec unit 24. Next, the real-time video signals captured by the video input unit 20 and the real-time audio signals received by the second audio I/O unit 21 are sent back to the first processor 13 through wireless communication between the second wireless transceiver unit 25 and the first wireless transceiver unit 14. The captured real-time video signals are then sent to the video display unit 10 to be displayed, while the real-time audio signals are sent to the first audio I/O unit 11 to be played synchronously; the A/V data may also be stored to the external storage medium 4 at the same time. Through the wireless camera 2, the body 1 can play A/V signals at the remote end in real time, and thus, a remote surveillance mode is formed.

Figure 4:
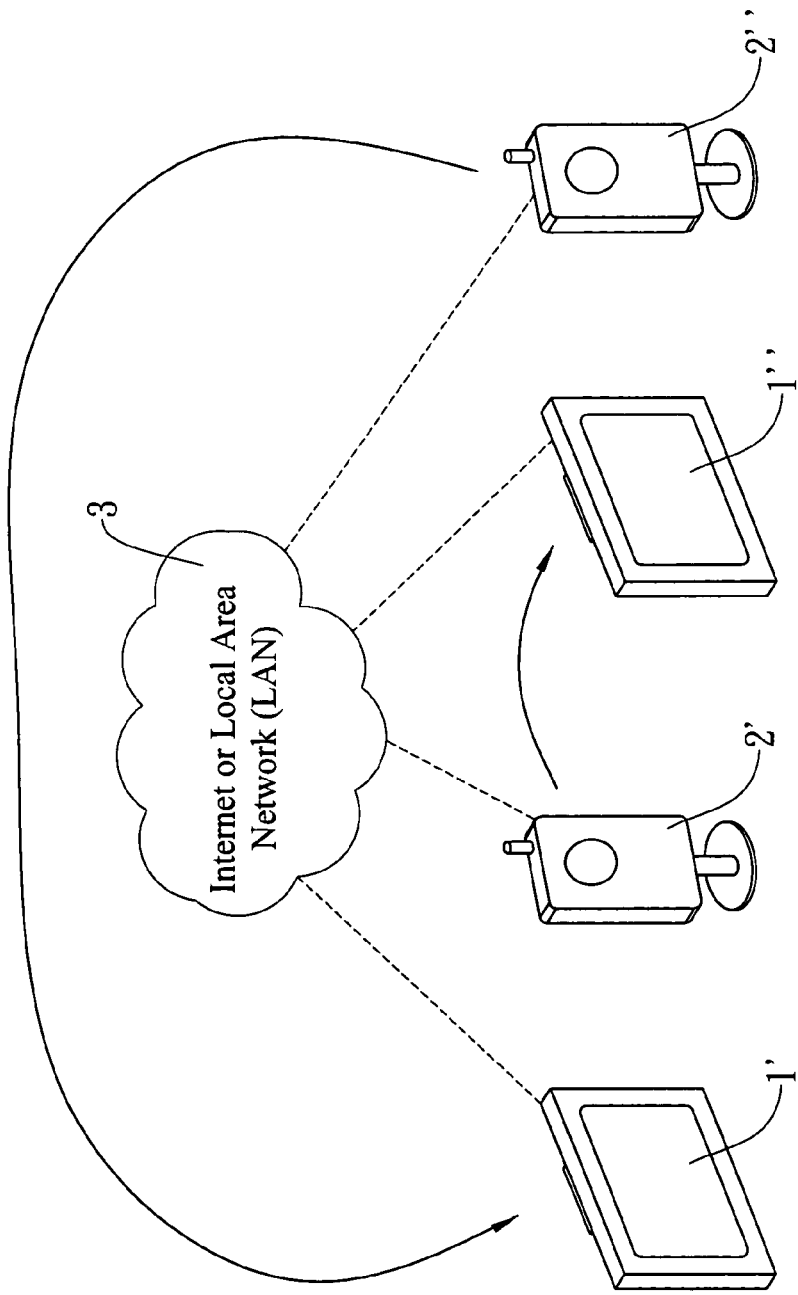
FIG. 4 depicts a block diagram of a wireless digital picture frame with video streaming capabilities according to yet another embodiment of the present invention.

Referring to FIG. 4, a block diagram of a wireless digital picture frame with video streaming capabilities according to yet another embodiment of the present invention is shown. The wireless digital picture frame in this embodiment comprises: a first body 1', a second body 1", a first wireless camera 2', and a second wireless camera 2". Either of the first body 1' and second body 1" includes a video display unit 10, a first audio I/O unit 11, a first input unit 12, a first processor 13, and a first wireless transceiver unit 14 (as shown in FIG. 1). Either of the first wireless camera 2' and second wireless camera 2" includes a video input unit 20, a second audio I/O unit 21, a second processor 23, an audio codec unit 24, and a second wireless transceiver unit 25 (as shown in FIG. 2).

In this embodiment, the first body 1' and the first wireless camera 2' are located with one user, while the second body 1" and the second wireless camera 2" are located with another user at a remote end. After the first processor 13 of the first body 1' receives a command input by one user through the first input unit 12 of the first body 1', the command signal is sent to the second processor 23 of the second wireless camera 2" through wireless communication between the first wireless transceiver unit 14 of the first body 1' and the second wireless transceiver unit 25 of the second wireless camera 2" using the Internet or a LAN, so as to control the video input unit 20 of the second wireless camera 2" to capture real-time video signals and to control the second audio I/O unit 21 of the second wireless camera 2" to receive real-time audio signals concurrently. The audio signals are then digitized and encoded by the audio codec unit 24 of the second wireless camera 2". Next, the real-time video signals captured by the video input unit 20 and the real-time audio signals received by the second audio I/O unit 21 of the second wireless camera 2" are sent back to the first processor 13 of the first body 1' through wireless communication between the second wireless transceiver unit 25 of the second wireless camera 2" and the first wireless transceiver unit 14 of the first body 1'. The captured real-time video signals are then sent to the video display unit 10 of the first body 1' to be displayed, while the real-time audio signals are sent to the first audio I/O unit 11 of the first body 1' to be played synchronously. As one user is operating the first body 1'—causing the second wireless camera 2" to capture A/V signals and send them through the Internet or LAN to the first body 1' to be played—at the same time, the other user at the remote end is operating the second body 1". After the first processor 13 of the second body 1" receives a command input by the user at the remote end through the first input unit 12 of the second body 1", the command signal is sent to the second processor 23 of the first wireless camera 2' through wireless communication between the first wireless transceiver unit 14 of the second body 1" and the second wireless transceiver unit 25 of the first wireless camera 2' using the Internet or LAN, so as to control the video input unit 20 of the first wireless camera 2' to capture real-time video signals and to control the second audio I/O unit 21 of the first wireless camera 2' to receive real-time audio signals concurrently. The audio signals are then digitized and encoded by the audio codec unit 24 of the first wireless camera 2'. Next, the real-time video signals captured by the video input unit 20 and the real-time audio signals received by the second audio I/O unit 21 of the first wireless camera 2' are sent back to the first processor 13 of the second body 1" through wireless communication between the second wireless transceiver unit 25 of the first wireless camera 2' and the first wireless transceiver unit 14 of the second body 1". The captured real-time video signals are then sent to the video display unit 10 of the second body 1" to be displayed, while the real-time audio signals are sent to the first audio I/O unit 11 of the second body 1" to be played synchronously. In sum, the A/V signals captured by the second wireless camera 2" are sent to the first body 1' to be played in real time, whereas the A/V signals captured by the first wireless camera 2' are sent to the second body 1" to be played in real time. Therefore, two users may apply the wireless digital picture frames of the present invention to do videoconferences or make videophone calls.

While the present invention has been described by way of examples and in terms of preferred embodiments, it is to be understood that the present invention is not limited hereto, and that various changes and modifications can be made by those skilled in the art without departing from the spirit and scope of this invention. For example, the video display unit may further include multi-display capabilities to display plural screen images, such as split-screen and picture-in-picture functionalities, so as to allow the user to surf the Internet, view digital photos, or conduct remote surveillance at the same time.

What is claimed is:

1. A wireless digital picture frame with video streaming capabilities, comprising:
    a body, having a video display unit, a first audio I/O unit, a first input unit, a first processor, and a first wireless transceiver unit; and
    a wireless camera, having a video input unit, a second audio I/O unit, an audio codec unit, a second processor, and a second wireless transceiver unit, wherein a command is input to said first processor through said first input unit; then, said command signal is transmitted to said second processor through wireless communication between said first wireless transceiver unit and said second wireless transceiver unit, for controlling said video input unit to capture a real-time video signal and for controlling said second audio I/O unit to receive a real-time audio signal concurrently; then, said real-time audio signal is digitized and encoded by said audio codec unit; then, said real-time video signal and said real-time audio signal are sent back to said first processor through wireless communication between said second wireless transceiver unit and said first wireless transceiver unit; finally, said real-time video signal is transmitted to said video display unit to be displayed and said real-time audio signal is transmitted to said first audio I/O unit to be played.

2. The digital picture frame as recited in claim 1, wherein said first input unit utilizes a keypad or a touch screen.

3. The digital picture frame as recited in claim 1, wherein said first wireless transceiver unit is a Wi-Fi interface or a proprietary wireless protocol.

4. The digital picture frame as recited in claim 1, wherein said body further includes an I/O interface unit configured therein, said I/O interface unit being a multi-card reader interface, USB client interface, USB host interface, High Definition Multimedia Interface (HDMI), or standard video output interface.

5. The digital picture frame as recited in claim 4, wherein said multi-card reader interface can connect to one of the CompactFlash (CF), MultiMedia Card (MMC), Memory Stick (MS), Secured Digital (SD), and xD-Picture Card (xD).

6. The digital picture frame as recited in claim 4, wherein said USB client interface can connect to a PC for data transfer through a USB cable.

7. The digital picture frame as recited in claim 4, wherein said USB host interface can connect to a USB external mass storage device for data transfer.

8. The digital picture frame as recited in claim 1, wherein said body further includes a wireless remote control receiver unit and a wireless remote control transmitter unit, said wireless remote control transmitter unit transmitting commands to said wireless remote control receiver unit through infrared or wireless communication, so as to allow the user to control the operations of said body by inputting commands.

9. The digital picture frame as recited in claim 1, wherein said video display unit further has multi-display capabilities to display plural screen images, so as to allow the user to surf the Internet, view digital photos, or conduct remote surveillance at the same time.

10. A wireless digital picture frame with video streaming capabilities, comprising:
a body, having a video display unit, a first audio I/O unit, a first input unit, a first processor, and a first wireless transceiver unit; and
a wireless camera, having a video input unit, a second audio I/O unit, an audio codec unit, a second processor, and a second wireless transceiver unit, wherein a command is input to said first processor through said first input unit; then, said command signal is transmitted to said second processor through wireless communication between said first wireless transceiver unit and said second wireless transceiver unit using the Internet or a LAN, for controlling said video input unit to capture a real-time video signal and for controlling said second audio I/O unit to receive a real-time audio signal concurrently; then, said real-time audio signal is digitized and encoded by said audio codec unit; then, said real-time video signal and said real-time audio signal are sent back to said first processor through wireless communication between said second wireless transceiver unit and said first wireless transceiver unit using the Internet or the LAN; finally, said real-time video signal is transmitted to said video display unit to be displayed and said real-time audio signal is transmitted to said first audio I/O unit to be played, so as to allow said body to play remote A/V signals in real time through said wireless camera.

11. The digital picture frame as recited in claim 10, wherein said body further includes an I/O interface unit configured therein, said I/O interface unit being a multi-card reader interface, USB client interface, USB host interface, High Definition Multimedia Interface (HDMI), or standard video output interface.

12. The digital picture frame as recited in claim 10, wherein said multi-card reader interface can connect to one of the CompactFlash (CF), MultiMedia Card (MMC), Memory Stick (MS), Secured Digital (SD), and xD-Picture Card (xD).

13. The digital picture frame as recited in claim 10, wherein said USB client interface can connect to a PC for data transfer through a USB cable.

14. The digital picture frame as recited in claim 10, wherein said USB host interface can connect to a USB external mass storage device for data transfer.

15. The digital picture frame as recited in claim 10, wherein said body further includes a wireless remote control receiver unit and a wireless remote control transmitter unit, said wireless remote control transmitter unit transmitting commands to said wireless remote control receiver unit through infrared or wireless communication, so as to allow the user to control the operations of said body by inputting commands.

16. The digital picture frame as recited in claim 10, wherein said video display unit further has multi-display capabilities to display plural screen images, so as to allow the user to surf the Internet, view digital photos, or conduct remote surveillance at the same time.

17. A wireless digital picture frame with video streaming capabilities, comprising:
a first body, having a video display unit for displaying digital images, a first audio I/O unit for playing audio signals, and a first wireless transceiver unit;
a first wireless camera, having a video input unit for capturing videos, a second audio I/O unit for receiving audio signals, and a second wireless transceiver unit;
a second body, also having a video display unit for displaying digital images, a first audio I/O unit for playing audio signals, and a first wireless transceiver unit; and
a second wireless camera, also having a video input unit for capturing videos, a second audio I/O unit for receiving audio signals, and a second wireless transceiver unit;
said first body and first wireless cameras are located with a user while said second body and second wireless camera are located with another user at a remote end, wherein said second wireless transceiver units of the second and first wireless cameras are wirelessly connected to said first wireless transceiver units of the first and second digital picture frame bodies respectively through the Internet or a LAN, so as to allow the real-time video signals captured by said video input units of the second and first wireless cameras to be transmitted to said video display units of the first and second digital picture frame bodies to be displayed, and the audio signals received by said second audio I/O units of the second and first wireless cameras to be transmitted to said first audio I/O units of the first and second digital picture frame bodies to be played.

18. The digital picture frame as recited in claim 17, wherein each of said first and second digital picture frame bodies further comprises a first input unit and a first processor and each of said first and second wireless cameras further comprises an audio codec unit and a second processor, and wherein a command is input to said first processor through said first input unit; then, said command signal is transmitted to said second processor through wireless communication between said first wireless transceiver unit and said second wireless transceiver unit using the Internet or a LAN, for controlling said video input unit to capture a real-time video signal and for controlling said second audio I/O unit to receive a real-time audio signal concurrently; then, said real-time audio signal is digitized and encoded by said audio codec unit; then, said real-time video signal and said real-time audio signal are sent back to said first processor through wireless communication between said second wireless transceiver unit and said first wireless transceiver unit using the Internet or the LAN; finally, said real-time video signal is transmitted to said video display unit to be displayed and said real-time audio signal is transmitted to said first audio I/O unit to be played, so as to allow said body to play remote A/V signals in real time through said wireless camera.

19. The digital picture frame as recited in claim 17, wherein each of said first and second digital picture frame bodies further includes a wireless remote control transmitter unit and a wireless remote control receiver unit, said wireless remote control transmitter units transmitting commands to said wireless remote control receiver units through infrared or wireless communication, so as to allow the user to control the operations of said digital picture frame bodies by inputting commands.

20. The digital picture frame as recited in claim 17, wherein said video display unit further has multi-display capabilities to display plural screen images, so as to allow the user to surf the Internet, view digital photos, or conduct remote surveillance at the same time.

* * * * *